United States Patent [19]
Garcia

[11] Patent Number: 6,067,331
[45] Date of Patent: May 23, 2000

[54] SYSTEM AND METHOD FOR BINARY CORRELATION

[75] Inventor: Domingo G. Garcia, Plano, Tex.

[73] Assignee: Texas Instruments Incorporated, Dallas, Tex.

[21] Appl. No.: 08/985,897

[22] Filed: Dec. 5, 1997

Related U.S. Application Data

[60] Provisional application No. 60/033,225, Dec. 5, 1996.

[51] Int. Cl.[7] .................................................. H04L 27/06
[52] U.S. Cl. ............................................................ 375/343
[58] Field of Search ..................................... 375/316, 343, 375/340; 364/728.03, 728.06; 377/78, 76

[56] References Cited

U.S. PATENT DOCUMENTS

| | | | |
|---|---|---|---|
| 4,593,378 | 6/1986 | McWhirter et al. | 364/728.03 |
| 5,260,972 | 11/1993 | Wang | 375/232 |
| 5,565,982 | 10/1996 | Lee et al. | 356/317 |
| 5,581,177 | 12/1996 | Hussey et al. | 327/165 |
| 5,745,533 | 4/1998 | Asada et al. | 375/354 |

*Primary Examiner*—Tesfaldet Bocure
*Attorney, Agent, or Firm*—Robert D. Marshall, Jr.; W. James Brady, III; Frederick J. Telecky, Jr.

[57] ABSTRACT

A system (10) is provided for performing binary correlation. The system (10) includes a plurality of reference bit registers (12–18). Each reference bit register (12–18) stores a reference bit of a reference sequence. A plurality of sequentially coupled data bit registers (20–26) can sequentially receive and store each data element of an input data stream. At least one programmable delay unit (28, 30) is coupled between sequential data bit registers (20–26). Each programmable delay unit (28, 30) delays at least one data element of the input data stream between the sequential data bit registers (20–26). A plurality of exclusive OR units (32–38) are each coupled to a corresponding reference bit register (12–18) and a corresponding data bit register (20–26). Each exclusive OR unit (32–38) performs an exclusive OR operation between a reference bit stored in the corresponding reference bit register (12–18) and a data element stored in the corresponding data bit register (20–26) in order to generate a resultant bit. A sum unit (40) is coupled to the exclusive OR units. The sum unit (40) sums the resultant bits generated by the exclusive OR units (32–38).

7 Claims, 1 Drawing Sheet

SYSTEM AND METHOD FOR BINARY CORRELATION

This application claims priority under 35 U.S.C. 119(e)(1) of provisional application Ser. No. 60/033,225, filed Dec. 5, 1996.

TECHNICAL FIELD OF THE INVENTION

The present invention relates generally to signal processing, and more particularly, to a system and method for binary correlation.

BACKGROUND OF THE INVENTION

Binary correlation is a technique for determining how closely one sequence of data matches another. The binary correlation function for two binary sequences is defined by the following equation:

$$\phi_{ab}[m] = n - \sum_{i=0}^{2^n-1} a[n+m] \oplus b[n] \quad (1)$$

where a and b are sequences comprising n bits, each bit having a value of "0" or "1."

As equation (1) indicates, in binary correlation, an exclusive OR operation is performed bit by bit between the two sequences a and b. Each exclusive OR operation generates either a "zero" or a "one." The number of resulting "zeros" are summed. A comparison of the number of "zeros" against the number of bits (n) in each of the binary sequences indicates how closely the two sequences match.

In a typical application, such as spread spectrum communications, pattern/character recognition, or radar processing, binary correlation can be used to process a continuous binary data stream in order to find a particular data pattern corresponding to a fixed reference sequence. Referring to equation (1), one of sequences a and b can be the fixed reference sequence and the other can be the corresponding data pattern. In order to ensure that the correct data pattern has been found, the length n of the sequences should be maximized.

Although devices have been previously developed to perform binary correlation, these prior binary correlators have been problematic for numerous reasons. For example, in some binary correlator applications, there are multiple samples per bit of data in a binary data stream. In such cases, prior binary correlators could be used in one of several ways. According to a first way, one sample was arbitrarily selected for each data bit in order to generate a sample data sequence to be compared against the reference sequence. This first way was undesirable because it discarded a number of samples which may have contained useful information.

Under a second way, a separate binary correlator was provided for each sequence of related samples. For example, if there were two samples per input data bit, two separate binary correlators were used. One correlator received the first sample for each bit and the other correlator received the second sample. This second way was undesirable since multiple binary correlators were required, thereby increasing the cost of implementation.

According to yet a third way, all samples were input into the same binary correlator to produce a number of outputs. However, only a portion of these outputs were used in any given clock period, thereby, in effect, reducing the length of the reference sequence over which the binary correlator operated.

SUMMARY OF THE INVENTION

In accordance with the present invention, the disadvantages and problems associated with previous binary correlators have been substantially reduced or eliminated.

According to an embodiment of the present invention, a system is provided for performing binary correlation. The system includes a plurality of reference bit registers. Each reference bit register stores a reference bit of a reference sequence. A plurality of sequentially coupled data bit registers can sequentially receive and store each data element of an input data stream. At least one programmable delay unit is coupled between sequential data bit registers. Each programmable delay unit delays at least one data element of the input data stream between the sequential data bit registers. A plurality of exclusive OR units are each coupled to a corresponding reference bit register and a corresponding data bit register. Each exclusive OR unit performs an exclusive OR operation between a reference bit stored in the corresponding reference bit register and a data element stored in the corresponding data bit register in order to generate a resultant bit. A sum unit is coupled to the exclusive OR units. The sum unit sums the resultant bits generated by the exclusive OR units.

According to another embodiment of the present invention, a programmable delay unit is provided for coupling between two sequential data bit registers of a binary correlator. The programmable delay unit includes at least one flip flop having an input and an output. The flip flop can delay a data element of an input data stream. A multiplexer is coupled to the flip flop. The multiplexer outputs one of the input and the output of the flip flop.

According to yet another embodiment of the present invention, a method is provided for performing binary correlation between a reference sequence comprising a plurality of reference bits and an input data stream comprising a plurality of data elements, wherein at least a portion of the data elements may each comprise a sample for a data bit in an input data sequence. The method includes the following steps: storing each reference bit of the reference sequence in a separate reference bit register; shifting each data element of the input data stream through a plurality of sequentially coupled data bit registers; delaying each data element between sequential data bit registers according to a number of samples per data in the input data sequence; performing an exclusive OR operation on the data elements within the data bit registers and the reference bits within the reference bit registers to generate a plurality of resultant bits; and summing the resultant bits.

The present invention provides various technical advantages over previous binary correlators. For example, one technical advantage includes constructing a binary correlator having a programmable delay unit coupled between sequential data bit registers. Each programmable delay unit can be programmed to delay the shifting of data elements through the data bit registers, according to the number of samples per data bit in an input data stream. For example, a delay of one clock period is used when there are two samples per data bit; a delay of two clock periods is used when there are three samples per data bit; and so on. A corresponding reference bit register is provided for each data bit register. The binary correlator of the present invention can operate on all samples of each data bit, using the same length for the reference sequence regardless of the number of samples per bit. Other technical advantages are readily apparent to one skilled in the art from the following figures, descriptions, and claims.

BRIEF DESCRIPTION OF THE DRAWINGS

For a more complete understanding of the present invention and for advantages thereof, reference is now made to the following description taken in conjunction with the accompanying drawings, wherein like reference numerals represent like parts, in which.

DETAILED DESCRIPTION OF THE INVENTION

Figure 1:
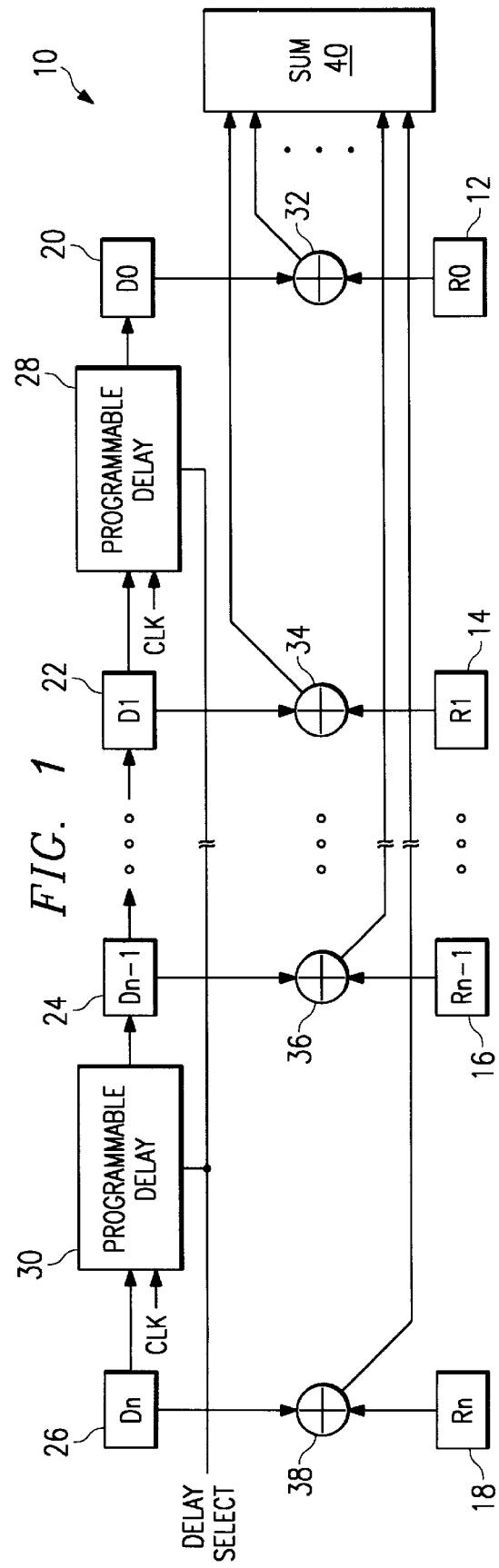
FIG. 1 is a block diagram of a binary correlator formed according to the teachings of the present invention.
Figure 2:
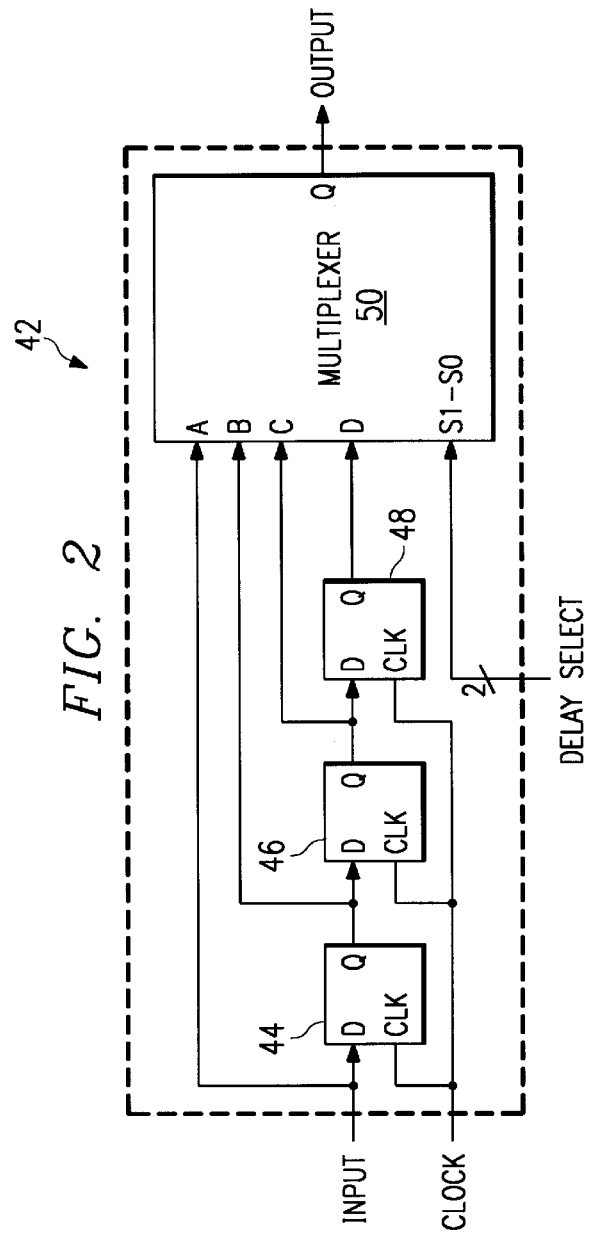
FIG. 2 is a schematic diagram of an exemplary programmable delay unit contained within the binary correlator shown in FIG. 1.

The present invention and its advantages are best understood by referring to FIGS. 1 and 2 of the drawings, like numerals being used for like and corresponding parts of the various drawings.

FIG. 1 is a block diagram of an exemplary binary correlator 10 constructed in accordance with the teachings of the present invention. As shown, binary correlator 10 includes a plurality of reference bit registers 12–18, a plurality of data bit registers 20–26, a plurality of programmable delay units 28, 30, a plurality of exclusive OR operators 32–38, and a sum unit 40.

Reference bit registers 12–18 collectively function to store a reference sequence R comprising n bits, these reference bits referred to as R0, R1, . . . , Rn−1, and Rn. As shown, reference bit registers 12, 14, 16, and 18 may store references bits R0, R1, Rn−1, and Rn, respectively. Each of reference bit registers 12–18 can be implemented as a normal bit register. It should be understood that the total number of reference bit registers 12–18 in binary correlator 10 can be adapted according to the desired length of the reference sequence. Exemplary lengths for the reference sequence include sixty-four bits, one-hundred-twenty-eight bits, and two-hundred-fifty-six bits.

Each data bit register 20–26 corresponds to one of reference bit registers 12–18. Data bit registers 20–26 are coupled in sequence. A plurality of data elements in an input data stream may be sequentially shifted and stored in data bit registers 20–26. The input data stream may contain an input data sequence having at least n data bits, these data bits referred to as D0, D1, . . . Dn−1, and Dn. As shown, data bit registers 20, 22, 24, and 26 are associated with data bits D0, D1, Dn−1, and Dn, respectively, of the input data sequence. Like reference bit registers 12–18, each of data bit registers 20–26 can be implemented as a normal bit register. The total number of data bit registers 20–26 in binary correlator 10 is preferably the same as the total number of reference bit registers 12–18.

An input data stream containing the input data sequence comprises at least n data elements, wherein each data element can be a sample for one of the data bits in the input data sequence. The length of such input data stream—i.e., the number of data elements—depends upon the number of samples per data bit. For example, if there is only one sample per data bit, the input data stream includes at least n data elements. If there are two samples per data bit, the input data stream includes at least 2n data elements. In general, the number of data elements in an input data stream containing the data sequence is equal to at least the product of the number of data bits in the data sequence and the number of samples per data bit.

Programmable delay units 28, 30 are coupled between sequential data bit registers. As shown, programmable delay unit 28 is coupled between data bit registers 20 and 22, and programmable delay unit 30 is coupled between data bit registers 24 and 26. Each programmable delay unit 28, 30 can function to delay the data elements of the input data stream as these data elements are shifted between sequential data bit registers 20–26. The delay can be selected or adjusted according to the number of samples provided for each data bit in an input data sequence contained within the data stream. More specifically, for x samples per data bit, each data element is held within a programmable delay unit 28, 30 for x−1 clock periods. For example, if there are two samples per data bit, programmable delay units 28, 30 will hold a data element for one clock period. Similarly, if there are three samples per data bit, each programmable delay unit 28, 30 functions to store each data element for two clock periods. Programmable delay units 28, 30 receive a clock (CLK) signal and a delay select signal. The delay select signal can be used to set the number of clock periods over which a data element is delayed. An exemplary implementation of programmable delay units 28, 30 is illustrated and described below with reference to FIG. 2.

Each exclusive OR operator 32–38 is coupled to one data bit register 20–26 and one reference bit register 12–18. Exclusive OR operators 32–38 each output a resultant bit corresponding to an exclusive OR operation of a data element of the input data stream and a reference bit of the reference sequence. More specifically, for any given clock period, each exclusive OR operator 32–38 functions to perform an exclusive OR operation upon the contents of the data bit register 20–26 and the reference bit register 12–18, respectively, to which the exclusive OR operator 32–38 is coupled. For example, as shown, exclusive OR operator 32 operates upon reference bit R1 and the data element contained within data bit register 20. Exclusive OR operator 34 operates upon reference bit R2 and the data element contained within data bit register 22. Likewise, exclusive OR operator 36 operates upon reference bit R3 and the data element stored within data bit register 24. Exclusive OR operator 38 operates upon reference bit R4 and the data element within data bit register 26.

Each resultant bit generated by an exclusive OR operator 32–38 can have a value of "zero" or "one." A "zero" indicates that the reference bit and the data element match or have the same value. A "one" indicates that the reference bit and the data element do not have the same value.

Sum unit 40 is coupled to exclusive OR operator 32–38. For each clock period, sum unit 40 functions to count the number of resultant bits (output by exclusive OR operators 32–38) having a value of "zero." A comparison of this number of "zeros" against the value of n indicates how closely the sequence of data elements in data bit registers 20–26 matches the reference sequence.

In operation, the reference bits R0–Rn of the n-bit reference sequence are loaded into reference bit registers 12–18. Over a number of clock periods, the data elements of the input data stream, which may contain an n-bit input data sequence corresponding to the reference sequence, are shifted through the chain comprising data bit registers 20–26 and programmable delay units 28, 30. More specifically, in any given clock period, n data elements may be held in programmable delay units 28, 30 while other data elements are contained in data bit registers 20–26. Some of the data elements may each comprise a sample for a data bit of the input data sequence. In the case where multiple samples are provided for each data bit, several data elements of the input data stream may correspond to each data bit of the input data sequence. The delay select signal is used to program programmable delay units 28, 30 to hold or delay each data element for a specified number of clock periods, according to the number of samples per data bit. In each clock period, exclusive OR operators 32–38 perform an exclusive OR function between the n data elements stored in the data bit registers 20–26 and the n reference bits contained within reference bit registers 12–18, respectively. This operation of exclusive OR operators 32–38 generates a plurality of resultant bits, each of which may have a value of "one" or "zero." The resultant bits are input into sum unit 40, which counts the number of "zeros." For each clock period, a comparison of the number of "zeros" against the number of bits in the reference sequence indicates how closely the data elements within data bit registers 20–26 matches the reference bits contained in reference bit registers 12–18.

Thus, according to the present invention, a binary correlator 10 is provided which, operating alone, can compare all samples of each data bit in an input data sequence to a reference sequence having a specified length. The specified length is not altered even when there are multiple samples for each data bit. Consequently, useful information is not discarded, a separate binary correlator is not required for each sample of the input data stream, and the effective length of the reference sequence is not reduced when processing multiple samples.

FIG. 2 is a schematic diagram of an exemplary programmable delay unit 42 contained within binary correlator 10 shown in FIG. 1. Any, up to all, of programmable delay units 28, 30 can be implemented as exemplary delay unit 42. As shown, exemplary delay unit 42 comprises a plurality of flip flops 44–48 and a multiplexer 50.

Flip flop 44 may be connected to a data bit register 20–26 (shown in FIG. 1). Flip flops 46–48 are coupled in cascading arrangement to flip flop 44. Each flip flop 44–48 receives a clock signal and may function to perform a $z^{-1}$ delay on a data element of an input data stream. Stated differently, flip flops 44–48 may each delay a data element for one clock period.

The number of flip flops contained in programmable delay unit 42 may depend upon the maximum number of samples per bit in an input data sequence. In particular, this number of flip flops can be one less than the maximum number of samples per bit. For example, if the maximum number of samples per bit is equal to two, programmable delay unit 42 may comprise one flip flop. Similarly, if the maximum number of samples per bit is equal to four, programmable delay unit 42 comprises three flip flops 44–48, as shown in FIG. 2.

Multiplexer 50 is coupled to each of flip flops 44–48. In particular, multiplexer 50 comprises a plurality of inputs, which are labeled as inputs A–D. At input A, multiplexer 50 may receive the input for the first flip flop (i.e., flip flop 44) of the sequence of flip flops 44–48. At inputs B–D, multiplexer 50 may receive the outputs from each flip flop 44–48, respectively. Multiplexer 50 also may receive the delay select signal described above.

In operation, data elements from a data stream are input into programmable delay unit 42. As stated above, each data element may comprise a sample for a data bit in an input data sequence. Over a number of clock periods, the data elements can be shifted through flip flops 44–48 toward multiplexer 50. The inputs and/or outputs of flip flops 44–48 are fed into multiplexer 50 at inputs A–D. The delay select signal is used to select which one of the signals appearing at inputs A–D will be output by programmable delay unit 42. This selection depends upon the number of samples per bit for each data bit.

For example, if there is only one sample per data bit, the signal appearing at input A of multiplexer 50 (i.e., the input of flip flop 44) is selected for output by programmable delay unit 42. Consequently, each data element in the input data stream is not delayed within programmable delay unit 42.

If there are two samples per data bit, the signal appearing at input B is selected for output by programmable delay unit 42. The data element corresponding to this signal has been delayed for one clock period by flip flop 44. Consequently, each data element is delayed within programmable delay unit 42 for a single clock period.

If there are three samples per data bit, the signal at input C of multiplexer 50 is selected. The data element corresponding to this signal has been delayed one clock period by flip flop 44 and another clock period by flip flop 46. Accordingly, each data element output by programmable delay unit 42 is delayed for two clock periods.

Likewise, when there are three samples per data bit, the delay select signal is used to select the signal at input D. The corresponding data element has been delayed three clock periods—one clock period for each of flip flops 44, 46, and 48.

In the manner described above, the data elements in a data stream can be selectively delayed in programmable delay unit 42, according to the number of samples per data bit.

Although the present invention and its advantages have been described in detail, it should be understood that various changes, substitutions, and alterations can be made therein without departing from the spirit and scope of the invention as defined by the appended claims.

What is claimed is:

1. A system for performing binary correlation, comprising:

a plurality of reference bit registers, each reference bit register operable to store a reference bit of a reference sequence;

a plurality of sequentially coupled data bit registers, each data bit register operable to sequentially receive and store each data element of an input data stream;

at least one programmable delay unit coupled between sequential data bit registers, each programmable delay unit operable to delay at least one data element of the input data stream between the sequential data bit registers;

a plurality of exclusive OR units, each exclusive OR unit coupled to a corresponding reference bit register and a corresponding data bit register, each exclusive OR unit operable to perform an exclusive OR operation between a reference bit stored in the corresponding reference bit register and a data element stored in the corresponding data bit register in order to generate a resultant bit; and a sum unit coupled to the exclusive OR units, the sum unit operable to sum the resultant bits generated by the exclusive OR units.

2. The system of claim 1, wherein at least a portion of the data elements each comprise a sample of a data bit for an input data sequence, and wherein each programmable delay unit is operable to delay each data element according to a number of samples per data bit.

3. The system of claim 1, wherein each programmable delay unit comprises at least one flip flop operable to delay a data element.

4. The system of claim 1, wherein each programmable delay unit comprises:

at least one flip flop having an input and an output, the flip flop operable to delay a data element; and a multiplexer coupled to the flip flop, the multiplexer operable to output one of the input and the output of the flip flop.

5. The system of claim 1, wherein each programmable delay unit comprises:

a plurality of flip flops coupled in cascading arrangement, each flip flop having an input and an output, each flip flop operable to delay a data element; and a multiplexer coupled to the flip flops, the multiplexer operable to output one of the inputs and the outputs of the flip flops.

6. The system of claim 1, wherein each programmable delay unit is operable to receive a delay select signal operable to adjust the delay of the programmable delay unit.

7. A method for performing binary correlation between a reference sequence comprising a plurality of reference bits and an input data stream comprising a plurality of data elements, wherein at least a portion of the data elements may each comprise a sample for a data bit in an input data sequence, the method comprising the step of:

storing each reference bit of the reference sequence in a separate reference bit register;

shifting each data element of the input data stream through a plurality of sequentially coupled data bit registers;

delaying each data element between sequential data bit registers according to a number of samples per data in the input data sequence;

performing an exclusive OR operation on the data elements within the data bit registers and the reference bits within the reference bit registers to generate a plurality of resultant bits; and summing the resultant bits.

* * * * *